UNITED STATES PATENT OFFICE.

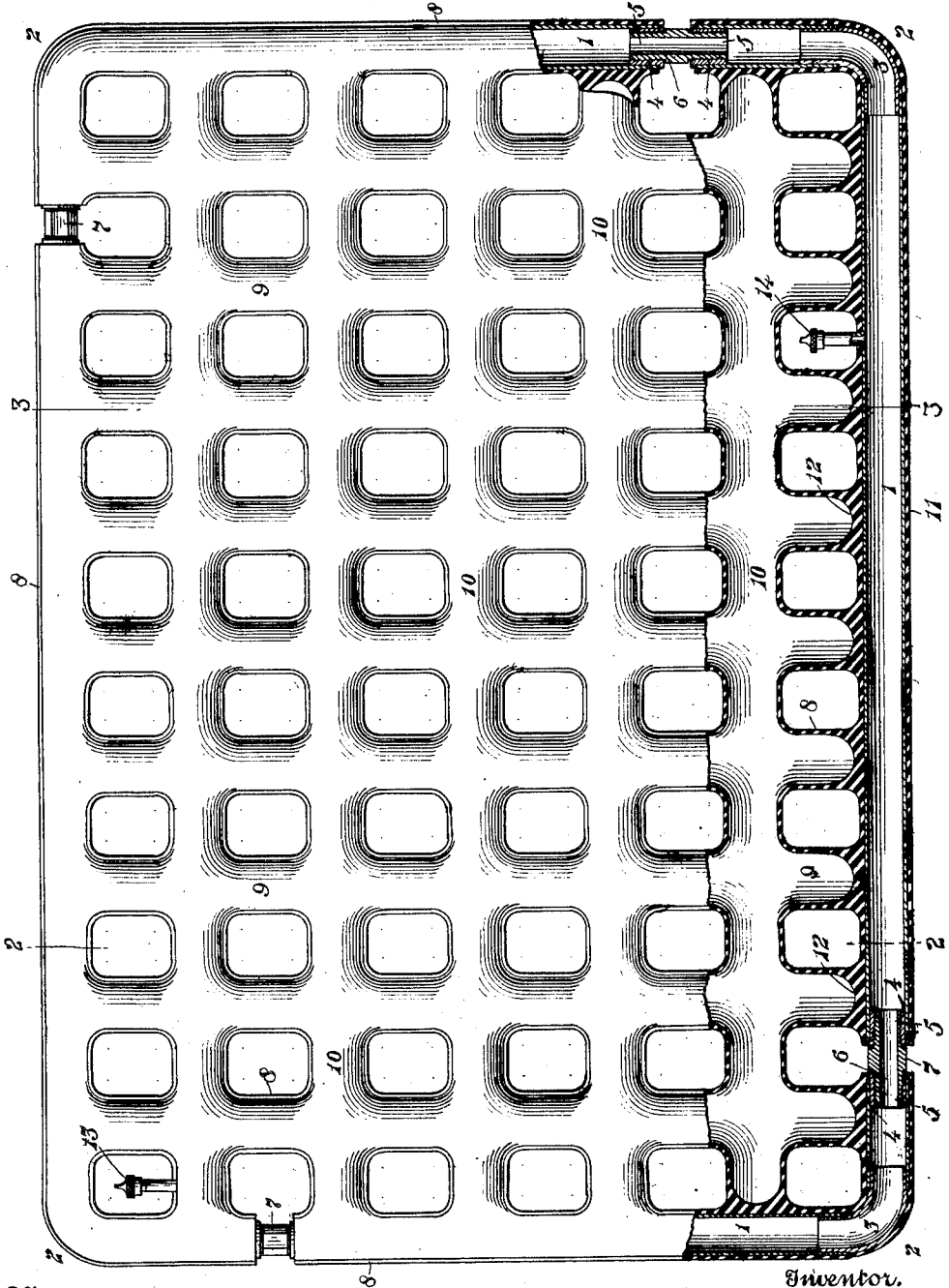

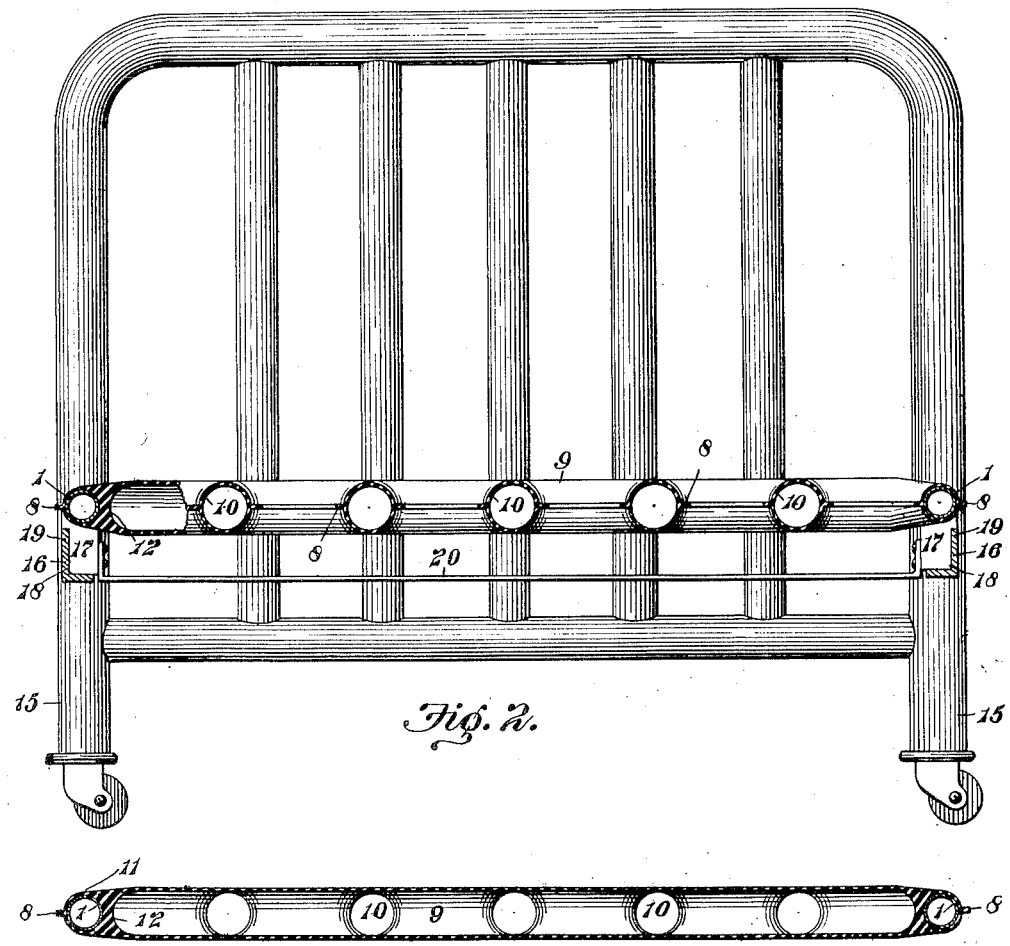
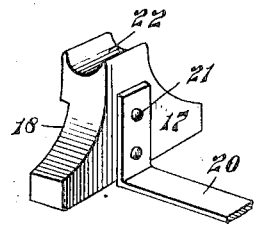
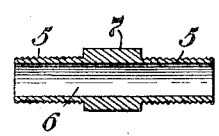
Inventor
John J. Lisbae.

JOHN J. LISBAE, OF CANTON, OHIO, ASSIGNOR OF ONE-HALF TO WILLIAM J. PIERO, OF CANTON, OHIO.

PNEUMATIC BED-SPRING.

1,089,652. Specification of Letters Patent. Patented Mar. 10, 1914.

Application filed September 15, 1911, Serial No. 649,573. Renewed January 22, 1914. Serial No. 813,773.

*To all whom it may concern:*

Be it known that I, JOHN J. LISBAE, a citizen of the United States, residing at Canton, in the county of Stark and State of Ohio, have invented a new and useful Pneumatic Bed-Spring, of which the following is a specification.

My invention relates to improvements in springs adapted for use upon beds in place of the metal or other springs heretofore commonly in use and especially to a form of springs made of a net work of intercommunicating rubber tubes stretched across and attached to a tubular frame extending around the outer edge of the device, said rubber tubes being adapted to be inflated to provide greater elasticity.

The objects of the invention are to generally improve devices of the character mentioned, and to provide a bed spring which will be sanitary and vermin proof as well as light, easily handled, strong, comfortable, noiseless, and thoroughly satisfactory and practical.

These objects, together with other objects apparent to those skilled in the art, may be attained by the construction illustrated in the accompanying drawings, although the invention may be embodied in other forms. the construction illustrated being chosen by way of example.

In the drawings Figure 1 is a top plan view of a pneumatic bed spring embodying the invention, parts being broken away to disclose internal construction. Fig. 2 is a view of the spring in place upon a bed of conventional design, said spring being shown in cross-section on the line 2—2 of Fig. 1, and one end of the bed shown in elevation. Fig. 3 is a sectional view on the line 3—3 of Fig. 1. Fig. 4 is a fragmentary perspective view showing the block for supporting the spring upon the side rail of the bed. Fig. 5 is a sectional view through one of the adjusting nipples.

Throughout the several views similar reference numerals indicate similar parts.

The frame of the spring is composed principally of hollow metal tubes 1 connected to each other at the corners 2 by hollow elbows 3 connected to said tubes by air tight joints. On each of the four sides of the frame an adjusting device is provided for increasing or decreasing the length of that side. In the drawings I have illustrated this device as comprising internally threaded thimbles 4 fitting into the ends of the tubes 1 and forming air tight joints therewith, the two thimbles of each of the various adjusting devices being relatively right and left threaded internally and adapted to receive the correspondingly right and left threaded extensions 5 of the adjusting nipple 6. Each nipple 6 is provided with a longitudinal bore or passage providing communication between the tubes to which the same is connected. In this way the interior of the tubular frame is continuous entirely around the four sides. The screw threads of the thimbles 4 and extensions 5 are relatively fine, closely fitted and air tight for the purpose hereinafter more fully to appear.

Each nipple is provided with the nut portion 7 adapted to be engaged, as by a wrench, for the purpose of turning the nipple for adjustment. The operative relation of the parts is shown in Fig. 1 and it will be understood that by turning the nipples in one direction the tubes will be brought closer together, whereas if said nipples are turned in the opposite direction the said tubes will be separated farther from each other, thus making it possible to increase or decrease the area described by the frame as may be desired. The rubber net work extending across the frame is preferably molded in upper and lower portions provided with lateral flanges 8 where said upper and lower portions are united, as by the process of vulcanizing. The transverse tubes 9 and longitudinal tubes 10 are formed integrally with each other and with the rubber casing 11 encircling the tubes 1. It will be noted that the casing 11 is omitted where the nut portions 7 of the adjusting devices are located so that said nut portions may be readily accessible.

The internal cylindrical cavities of all of the tubes in the entire device inter-communicate with each other at the numerous points of intersection of said tubes and extend to points adjacent the tubes 1 where they terminate as at 12 in the drawings.

Communicating with one of the rubber tubes is the air valve 13 of any well known construction and adapted for the attachment of an air pump for the purpose of inflating the entire net work of tubes. It will be understood that the entire net work may be uniformly inflated by reason of the intercommunication of said tubes.

Communicating with the interior of one of the tubes 1 another air valve 14 is provided and if desired an air pump may be connected to said valve 14 for the purpose of removing the air from the frame to produce a substantial vacuum in said frame. This provision is not essential to the proper operation of the device as a bed spring but when a bed spring of my invented design is used on a ship or wherever it may be advantageous to have a readily accessible life preserver the production of a vacuum in said outer tube may assist, in a degree, in increasing the buoyancy of the device.

From an inspection of Figs. 2 and 3 it will be noted that the general median horizontal plane of the rubber net work is coincident with the median horizontal general plane of the frame. For this reason any weight imposed upon said net work will draw uniformly and more directly inwardly without producing any twisting strain such as is commonly borne by the frames of metallic springs and the like where the net work is attached to one side of the members forming the frame.

In Fig. 2 I have illustrated the preferred method of arranging a spring of my invented construction upon a bed. In said figure the numerals 15 indicate the posts of the bed and the numerals 16 the side rails. Upon said side rails are arranged supporting blocks 17 preferably made of solid rubber as illustrated in Fig. 4, said blocks being appropriately made to conform to and securely rest upon the rails 16. In the drawings the supporting blocks are cut away at 18 to receive the vertical flanges 19 of the side rails, but it will be understood that said blocks may be of various forms of construction to accommodate various forms of side rails. The blocks 17 are arranged in transversely alined pairs and are held in spaced relation and in proper position upon the side rails by the cross-rod 20, preferably formed of metal and secured to the blocks 17 in any suitable mechanical manner, as by the rivets or bolts 21. The blocks 17 are provided at their tops with concave seats 22 adapted to receive the convex under side of the frame of the spring and its casing 11, said blocks being preferably arranged at points intermediate the ends of the tubes 9, and four of said blocks only being used, in the preferable arrangement to support the spring.

Attention should be called to the fact that the present invention is not in the nature of a pneumatic mattress or bed but is in the nature of a true bed spring, commonly so called, being intended to be supported only at the sides or ends, and forming an elastic means of suspension, light, strong and comfortable. If at any time should it be desired to increase or decrease the tension of the springs the adjusting nipples may be turned to increase or decrease the area defined by the frame and the tubes may be inflated to any degree desired, the inflation of said tubes and the adjustment of the frame being independent of each other but capable of appropriate relative adjustment to meet any conditions or requirements, while retaining the quality of appropriate and comfortable elasticity.

I claim:—

1. A pneumatic bed spring comprising a tubular frame having two end pieces and two side pieces, spaced, parallel, longitudinally disposed elastic, inflatable tubes connected at their ends to the two end pieces of said frame, and spaced, parallel, transversely disposed, elastic, inflatable tubes connected at their ends to the two side pieces of the frame, the transverse tubes intersecting and inter-connecting said longitudinal tubes, and forming a meshed network having its general median plane coincident with the general median plane of said frame, and means for the attachment of an inflating device for the purpose of inflating said tubes.

2. A pneumatic bed spring comprising a frame having four sides made of hollow metal tubes, said tubes connected to each other at the corners of the frame by hollow elbows, each of the four sides of the frame provided with an adjusting device comprising relatively right and left internally threaded thimbles fitting into the severed ends of the tubes and a nipple provided with right and left threaded extensions arranged in the internally threaded thimbles, each nipple having a longitudinal bore providing internal communication between the tubes to which the same is connected and having an external nut portion whereby the area inclosed by said frame may be increased or decreased by turning said nipples, and a rubber net-work of intersecting, intercommunicating inflatable tubes connected to and supported by said tubular frame, the general median plane of said network being normally coincident with the general median plane of said frame.

In testimony that I claim the above, I have hereunto subscribed my name in the presence of two witnesses.

JOHN J. LISBAE.

Witnesses:
 WILLIAM H. MILLER,
 IRENE M. LUTZ.